United States Patent [19]
Rosenband

[11] Patent Number: 5,350,074
[45] Date of Patent: Sep. 27, 1994

[54] PALLET RACK LOCK

[75] Inventor: Philip A. Rosenband, Palm Beach, Fla.

[73] Assignee: Morgan Marshall Industries, Inc., Chicago Heights, Ill.

[21] Appl. No.: 130,172

[22] Filed: Oct. 1, 1993

[51] Int. Cl.5 ............................................. A47F 5/00
[52] U.S. Cl. .................................. 211/192; 211/191; 248/222.1; 403/254
[58] Field of Search .............................. 211/192, 191; 248/222.1, 222.3; 403/316, 317, 319, 254

[56]  References Cited

U.S. PATENT DOCUMENTS

| | | | |
|---|---|---|---|
| 3,273,720 | 9/1966 | Seiz | 211/192 |
| 3,392,848 | 7/1968 | McConnell et al. | 211/192 |
| 3,414,224 | 12/1968 | Robilliard et al. | 211/192 X |
| 3,456,970 | 7/1969 | Sunasky | 211/192 X |
| 3,881,829 | 5/1975 | James | 211/192 X |
| 3,986,318 | 10/1976 | McConnell | 211/192 X |
| 4,165,944 | 8/1979 | Sunasky | 211/192 X |
| 4,955,743 | 9/1990 | King | 211/192 X |
| 5,131,781 | 7/1992 | Klein | 211/192 X |

Primary Examiner—Robert W. Gibson, Jr.
Attorney, Agent, or Firm—Anthony S. Zummer

[57] ABSTRACT

A pallet rack lock for use in a pallet rack system releasably locking one end of a shelf beam to an upright column is the subject matter of this invention. The column has a plurality of vertically spaced locking apertures. The rack lock includes a rock lock plate fixed to the shelf beam and positioned substantially parallel to the upright column. A load bearing stud is fixed to the lock plate. The stud is positioned in a lower portion of a locking aperture. A resilient carrier has one end fixed to the locking plate and the opposed end being free. A lock stud is mounted on the resilient carrier for movement therewith. The lock stud is positioned in an upper portion of a locking aperture to prevent upward movement of the load bearing stud. A dog limits the movement of the resilient carrier away from the lock plate. The lock stud may be selectively moved out of its locking aperture by bending a portion of the resilient carrier. The dog limits bending of the resilient carrier to prevent permanent deformation of the carrier.

15 Claims, 2 Drawing Sheets

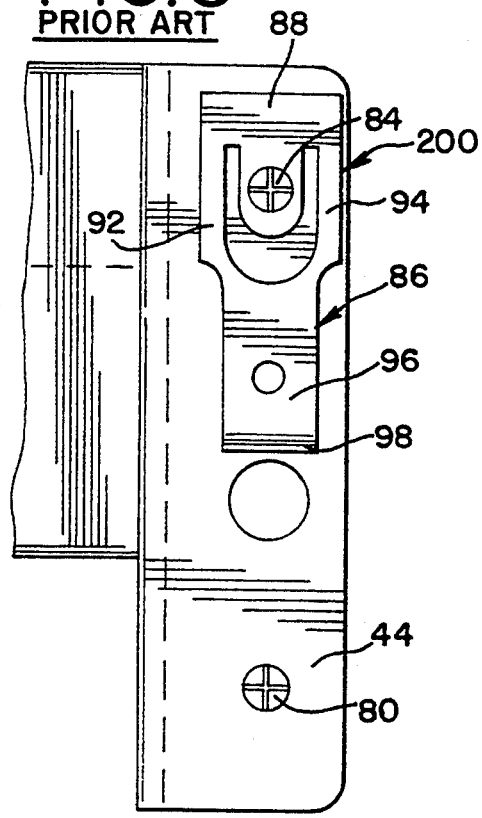
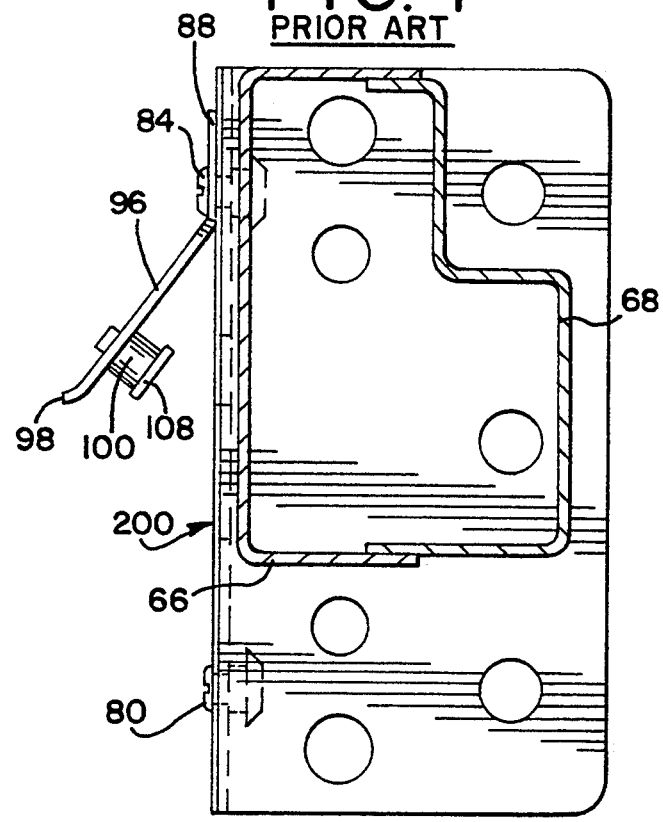
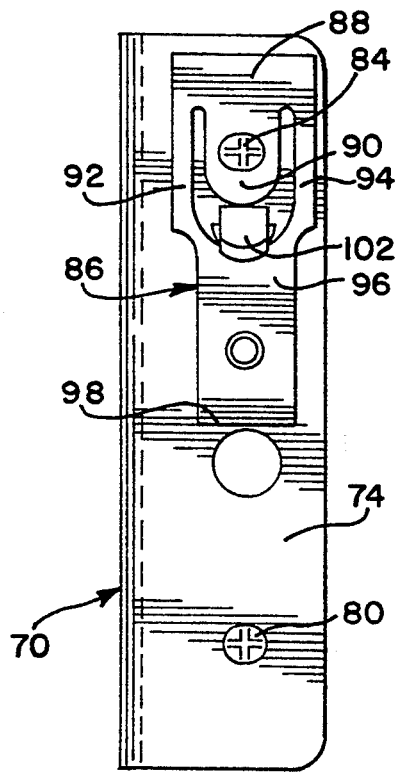
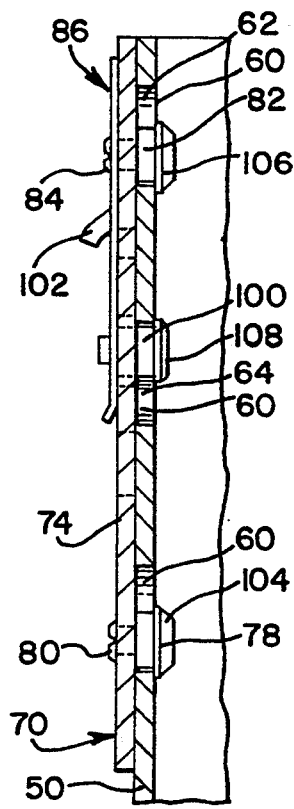
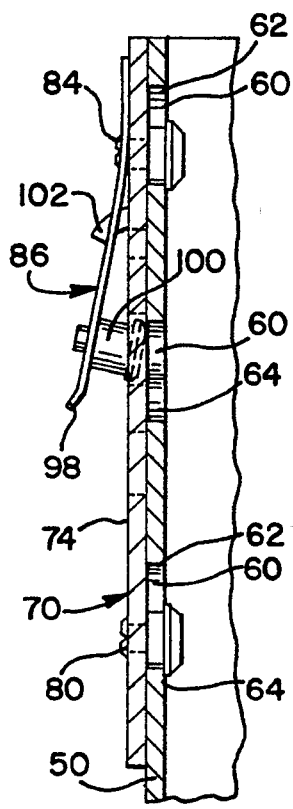

PALLET RACK LOCK

BACKGROUND OF THE INVENTION

Pallet rack systems are used extensively in many industries. Foods or other commodities are often palletized. Typically a palletized commodity will be off loaded from a truck, and a motorized pallet handler will move the palletized commodity to a storage area having pallet racks. Pallet racks are used to conserve floor space. It is desirable to stack the pallets on racks to allow the palletized materials to be selectively removed from the storage area.

Typically, the pallet racks have vertically spaced locking apertures in columns. Shelf beams are connected to the columns at the locking apertures by a releasable pallet rack lock. It is necessary to adjust selectively the height of the space between shelf beams of a pallet rack in certain operations. A shelf beam includes a pallet rack lock on each end. Each pallet rack lock includes a pair of load bearing studs. The load bearing studs fit into selected locking apertures in a column. To prevent the shelf beam from becoming detached from the column, the pallet rack lock includes a mechanism for releasably securing the beam to the column which lock requires a positive action to disengage a part from the column before the load bearing studs may be disengaged from their respective locking apertures.

There are a number of rack lock constructions which are well known. A typical rack lock is shown in U.S. Pat. No. 4,955,743 to King entitled "Rack Beam Latch" which was issued Sep. 11, 1990. U.S. Pat. No. 3,612,290 to Evans entitled "Releasable Key Clamp For A Pallet Rack" which issued Oct. 12, 1971, and U.S. Pat. No. 3,273,720 to Seiz for "Storage Racks" which issued on Sep. 20, 1966, also shows rack locks. Each of the three patents mentioned above have a basic construction in common in that a latching or locking member is held in its latch position by a resilient spring member. The resilient spring member is bent to disengage the latching member to release the locking member.

Generally, individuals who work with the pallet racks do not handle the pallet rack locks in a delicate manner. On occasion, a workman will insert a screwdriver under the resilient member to pry the latching member out of contact with a column. This operation sometimes results in the resilient member being bent beyond its elastic limit so that it takes a permanent set with the latching member being decommissioned as shown in FIG. 4 of the accompanying drawings.

Once the latching member is rendered inoperative, there is no safety locking of the end of a shelf beam to the column. The shelf beam can be disconnected from the column during normal operations in the storage area either by removing a pallet or positioning a pallet into a pallet rack.

It is a primary object of the present invention to provide a pallet rack lock which includes built-in self protection for the resilient member so that it will not be readily permanently deformed and thereby rendered inoperative.

SUMMARY OF THE INVENTION

The present invention is an improved rack lock used in a pallet rack system for releasably locking one end of a shelf beam of the pallet rack to an upright column of the pallet rack. The column has a plurality of a vertical-spaced keyhole shaped locking apertures. The rack lock includes a lock plate fixed to the shelf beam and positioned substantially parallel to the upright column. A pair of vertically spaced load bearing studs is fixed to the lock plate. The load bearing studs are spaced apart a distance sufficient to fit into respective locking apertures. Each of the load bearing studs rests in a lower portion of its respective locking aperture. A resilient carrier has one end fixed to the locking plate and the opposite end is free. A lock stud is mounted on the resilient carrier and movable therewith. The lock stud is removable positioned in an upper portion of a respective locking hole to prevent upward movement of the load bearing studs in their respective locking apertures. A dog connected to the lock plate limits movement of the resilient carrier away from the lock plate to allow the lock stud to be selectively moved from its respective locking apertures by bending a portion of the resilient carrier away from the lock plate without bending the resilient carrier sufficiently to deform the carrier permanently.

BRIEF DESCRIPTION OF THE DRAWINGS

FIG. 3 is a front elevational view of a prior art pallet rack lock;

FIG. 4 is a side elevational view of the pallet rack lock of FIG. 3 but showing a resilient carrier permanently deformed with a lock stud mounted thereon and positioned out of operative engagement with a column;

FIG. 5 is a front elevational view of the rack lock of FIG. 2;

FIG. 6 is a cross sectional view of the pallet rack lock of FIG. 5 but shown positioned in an attitude whereby the pallet rack lock is locked to a column; and FIG. 7 is a cross sectional view similar to FIG. 6 but showing a resilient carrier partially deformed to allow a lock stud to be withdrawn from engagement with the column to allow the pallet rack lock to be disengaged from the column.

BRIEF DESCRIPTION OF A SPECIFIC EMBODIMENT

Figure 1:
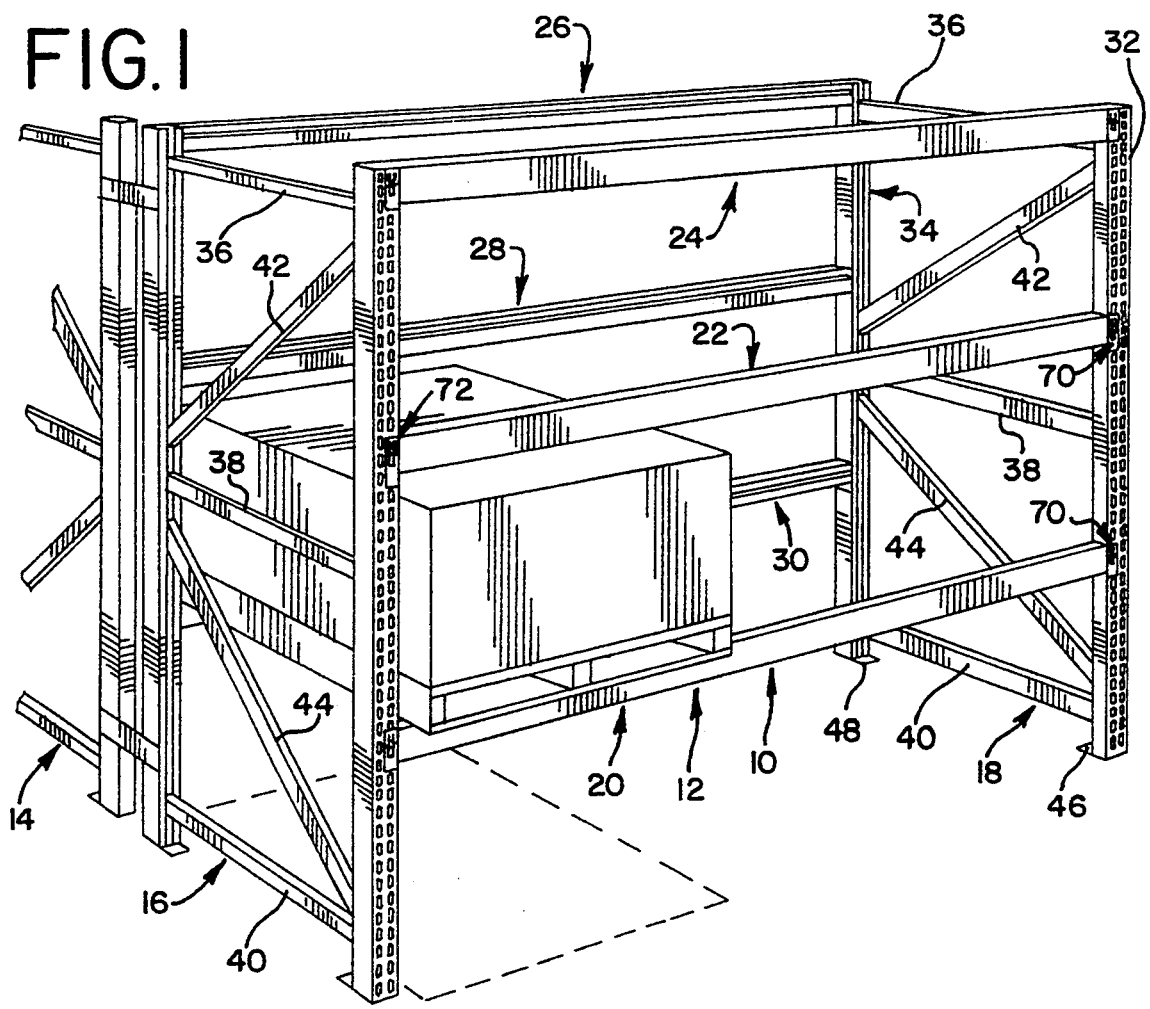
FIG. 1 is a perspective view of a pallet rack system having a pallet rack lock embodying the present invention mounted on opposed ends of each shelf beam.

Referring now to the drawings and especially to FIG. 1, a pallet rack system is shown therein and generally indicated by number 10. The pallet rack system includes a pallet rack 12 with a second pallet rack 14 connected thereto but only a portion of second pallet rack 14 is shown. The pallet racks are identical in their construction.

The pallet rack 12 includes a pair of identical frames and 18. The frames are connected by a plurality of identical shelf beams 20, 22, 24, 26, 28 and 30. It may be appreciated that any suitable number of shelf beams may be used with frames 16 and 18. Frame 18 includes a pair of upright columns 32 and 34, which are connected by horizontal box channel struts 36, 38 and 40 and by angular box channels struts 42 and 44. Footplates 46 and 48 are welded onto the bottoms of columns 32 and 34, respectively. Frame 16 has the identical construction of frame 18 and like numbers are used for like parts in the drawing of frame 16 in FIG. 1.

Figure 2:
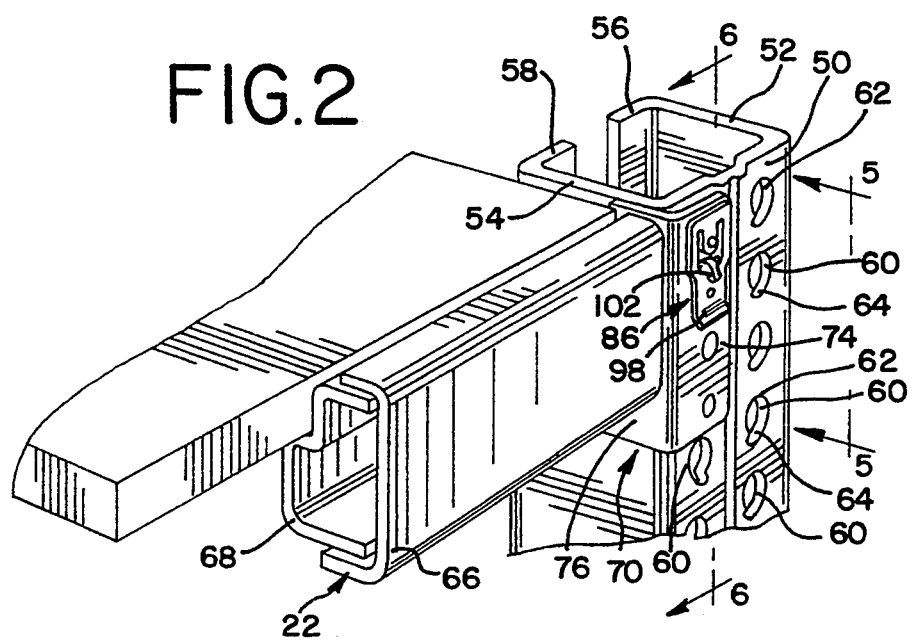
FIG. 2 is a perspective view of a portion of a shelf beam and a portion of an upright column of the pallet rack system of FIG. 1 with a pallet rack lock shown connecting the shelf beam and to the column.

Upright column 32 is a box channel having a face 50 and a pair of integral sides 52 and 54. Back ears 56 and 58, and are formed integral with sides 52 and 54, respectively, as may be best seen in FIG. 2. Face 50 has two aligned rows of identical locking apertures 60 formed therein as may be seen in FIGS. 1 and 2. In this instance, the locking apertures are spaced two inches apart; however, any other suitable spacing may be used depending upon the particular application of the pallet rack. Each of the locking apertures 60 is identical to each other locking aperture. Each locking aperture has a general keyhole shape outline with a larger portion 62 at the top or upper side of the aperture and a tapered lower side 64 at the bottom of the aperture.

Each of the shelf beams is identical to each other shelf beam. Shelf beam 22 generally consists of body which is made up of a U-shaped channel 66 having a step channel 68 welded inside channel 66. A pallet rack lock 70 is fixed to the right end of the shelf beam and a mirror image pallet rack lock 72 is fixed to the left end of the shelf beam. The construction of pallet rack locks 70 and 72 is identical except that pallet rack lock 72 is a mirror image of pallet rack lock 70.

Pallet rack lock 70 includes a lock plate 74 with a beam plate 76 formed integral with and at a right angle to the lock plate. Beam plate 76 is welded to the end of the shelf beam body. The lock plate has a lower load bearing stud 78 secured thereto by a screw 80. An identical upper load bearing stud 82 is fixed to the lock plate by a upper screw 84. The studs are spaced part for positioning in respective locking apertures and straddling with another locking aperture.

A resilient carrier 86 is secured to the lock plate by upper screw 84, which also secures stud 82 to the lock plate. The resilient carrier includes a base 88 with a tongue 90 formed integral therewith which tongue receives screw 84. Resilient arms 92 and 94 are integral with opposite ends of base 88 and are integral with a bar 96. A lip 98 is formed on the free end of bar 96. The two arms 92 and 94 allow resilient movement of bar 96 away from the lock plate. A lock stud 100 is fixed to bar 96 and is positioned closer to upper load bearing stud 82 than to lower load bearing stud 78.

A dog 102 is stamped out of lock plate 74 and is engageable with bar 96 of resilient carrier 86 between the fixed end of the resilient carrier and the free opposed end of that carrier. The dog limits the movement of the resilient carrier relative to lock plate 74.

The rack lock secures the end of the shelf beam to the upright column. The lock plate is positioned parallel to the upright column. When the lock stud is withdrawn to the position shown in FIG. 7, the two load bearing studs are positioned in the large portion of their respective locking apertures, and the shelf beam is moved downward so that the load bearing studs engage the tapered portion of their respective locking apertures. The lock stud is then allowed to enter the upper portion of the locking aperture between the two locking apertures receiving the load bearing studs. The lock stud in the upper portion of its locking aperture prevents the lock plate from moving upward, and the load bearing studs at the bottom of their respective apertures prevent any downward movement of studs 78 and 82. Studs 78, 82 and 100 have a similar construction in that studs 78, 82 and 100 have heads 104, 106 and 108, respectively. Heads 104 and 106 are positioned inside the column and prevent the locking plate from moving in a horizontal direction away from upright column. Thus, the shelf beam is locked to the upright column.

Inasmuch as lock stud 100 is supported on resilient carrier 86, it is a simple matter to lock the end of the shelf beam to the column. The lock plate is positioned adjacent to the upright column and moved downward with the studs until the two load bearing studs move into their respective locking apertures. At this point, the lock stud is still riding on the outside of the column with the resilient carrier constantly urging the lock stud inward toward the column. Once the load bearing studs are moved downward sufficiently to seat in their respective tapered portions, the lock stud drops into the enlarged portion of its respective locking aperture to lock the shelf beam into place.

Disengagement of one end of the shelf beam from the upright column is a simple operation. The resilient carrier 86 has its free end pivoted on spring arms 92 and 94 to withdraw lock stud 100 from its locking aperture. The lock plate is then moved upward so that the load bearing studs 78 and 82 may be removed from their respective aperturess and thereby disengaging the end of the shelf beam from the upright column.

A general configuration of a prior art rack lock 200 is shown in FIGS. 3 and 4. The prior art lock 200 has the same basic construction as lock 70 described in detail above, and the same numbers for like parts are applied to prior art lock 200.

It has been found that in the normal operation of lock 200, a workman may, in some instances, insert a tool under lip 98 to pry bar 96 upward and thereby remove the lock stud from engagement with the column. The arms 92 and 94 are easily bend in the operation. When bar 96 is moved upward an excessive amount, the elastic limit of the material in arms 92 and 94 is exceeded so that bar 96 takes a permanent set as shown in FIG. 4. The lock stud is rendered inoperative, and there is no lock to retain the end of the shelf beam connected to the upright column should the end of the beam be raised and pulled out during loading or unloading from the rack.

Rack lock 70 includes a dog 102, which limits the movement of arm 96 so that the elastic limit of the material is not easily exceeded to take a permanent set. Dog 102 allows the resilient carrier to be bent at the arms 92 and 94 with a small amount of force to move the lock stud. However, the movement is limited by dog 102. The dog is positioned closer to lip 98 so that the mechanical advantage of the force applied at the lip is cut almost in half. Furthermore, the combined width of arms 92 and 94 is less than the width of bar 96 so that a substantially greater force is required to bend arm 96 at dog 102. The combination of the reduction of mechanical advantage and the increase in effect size of the operational portion of the carrier results in a substantially greater force requirement to bend bar 96. This increased required force serves as a signal to a workman that the lock stud is removed from the locking aperture and no further movement is required. Furthermore, the additional force required to bend the bar is such that it discourages an application of a sufficient force to bend the bar and thereby render the lock inoperative.

Although a specific embodiment of the instant invention has been shown in the accompanying drawings and described in detail in the foregoing specification, it is readily apparent that those skilled in the art may have various modifications and changes without departing from the spirit and the scope from the present invention.

It is to be expressly understood that the scope of the present invention directed to improved rack lock is limited only by the appended columns.

I claim:

1. A rack lock in a pallet rack system releasably locking one end of a shelf beam of a pallet rack to an upright column of the pallet rack, said column has a plurality of vertically spaced locking apertures, said rack lock including; a lock plate fixed to the shelf beam and positioned substantially parallel to the upright column, a load bearing stud fixed to the lock plate, said load bearing stud positioned in a lower portion of a locking aperture, a resilient carrier having one end fixed to the locking plate and the opposite end being free, a lock stud mounted on the resilient carrier and movable therewith, said lock stud positioned in an upper portion of a respective locking aperture to prevent upward movement of the load bearing stud in its locking aperture, and a dog limiting movement of the resilient carrier away from the lock plate, whereby the lock stud may be selectively moved out of its locking aperture by bending a portion of the resilient carrier away from the lock plate and the dog limits bending of the resilient carrier sufficiently to prevent permanent deformation of the carrier.

2. A rack lock in a pallet rack system releasably locking one end of the shelf beam of a pallet rack to an upright column of the pallet rack as defined in claim 1, wherein each of the locking apertures has a general keyhole outline with a larger portion in the upper side and a smaller tapered portion in a lower side, said load bearing stud resting in engagement in the lower tapered portion of the aperture, and the lock stud positioned in the larger portion of its respective keyhole opening.

3. A rack lock in a pallet rack system releasably locking one end of a shelf beam of a pallet rack to an upright column of the pallet rack as defined in claim 1, wherein the dog is fixed to the lock plate and is engageable with the resilient carrier.

4. A rack lock in a pallet rack system releasably locking one end of a shelf beam of a pallet rack to an upright column of the pallet rack as defined in claim 1, wherein the dog is formed integral with the lock plate and is engageable with the resilient carrier.

5. A rack lock in a pallet rack system releasably locking one end of a shelf beam of a pallet rack to an upright column of the pallet rack as defined in claim 1, wherein the dog is engageable with the resilient carrier between the end fixed to the lock plate and the opposite end.

6. A rack lock in a pallet rack system releasably locking one end of a shelf beam of a pallet rack to an upright column of the pallet rack as defined in claim 1, wherein each of the locking apertures has a general keyhole outline with a larger portion in the upper side and a smaller tapered portion in the lower side, said load bearing stud resting in engagement with the lower tapered portion of its respective aperture, the lock stud position in the larger portion of the respective keyhole opening, and the dog is fixed to the lock plate and is engageable with the resilient carrier.

7. A rack lock in a pallet rack system releasably locking one end of a shelf beam of a pallet rack to an upright column of the pallet rack as defined in claim 1, wherein the dog is formed integral with the lock plate and is engageable with the resilient carrier, each of the locking apertures has general keyhole outline with a larger portion in the upper side and a smaller tapered portion in the lower side, said load bearing stud resting in engagement with the lower tapered portion of its respective aperture, and the lock stud positioned in the larger portion of its respective locking aperture.

8. A rack lock in a pallet rack system releasably locking one end of a shelf beam of a pallet rack to an upright column of the pallet rack as defined in claim 1, wherein the dog is engageable with the resilient carrier between the end fixed to the lock plate and the opposite end, each of the locking apertures has a general keyhole outline with a larger portion defining the upper side and a smaller tapered portion defining the lower side, said load bearing stud resting in engagement with the lower tapered portion of its respective locking aperture, and the lock stud in the larger portion of its respective locking aperture.

9. A rack lock in a pallet rack system releasably locking one end of a shelf beam of a pallet rack to an upright column of the pallet rack as defined in claim 1, wherein the dog is formed integral with the lock plate and is engageable with the resilient carrier between the end fixed to the locking plate and the free end, each of the locking apertures has a general keyhole outline with a larger portion defining the upper side of the aperture and a smaller tapered portion defining the lower side of the aperture, said load bearing stud resting in engagement with the lower tapered portion of the respective locking aperture.

10. A rack lock in a pallet rack system releasably locking one end of a shelf beam of a pallet rack to an upright column of the pallet rack as defined in claim 1, including, a second load bearing stud fixed to the lock plate vertically spaced from the first mentioned load bearing stud, said load bearing studs being spaced apart a distance sufficient to fit into respective locking apertures in the upright column, said second load bearing stud positioned in a lower portion of its respective locking aperture.

11. A rack lock in a pallet rack system releasably locking one end of a shelf beam of a pallet rack to an upright column of the pallet rack as defined in claim 10, wherein the load bearing studs are spaced apart a distance sufficient to fit into respective locking apertures straddling at least one locking aperture between the respective locking apertures.

12. A rack lock in a pallet rack system releasably locking one end of a shelf beam of a pallet rack to an upright column of the pallet rack as defined in claim 10, wherein said load bearing studs are spaced apart a distance sufficient to fit into respective locking apertures straddling at least one locking aperture, and the lock stud is positioned between the load bearing studs for positioning in a straddled locking aperture.

13. A rack lock in a pallet rack system releasably locking one end of a shelf beam of a pallet rack to an upright column of the pallet rack as defined in claim 10, wherein the dog is fixed to the lock plate and is engageable with the resilient carrier between the end fixed to the lock plate and the opposite end, each of the locking apertures has a general keyhole outline with a larger portion defining the upper side and smaller tapered portion defining the lower side, said load bearing studs being spaced apart a sufficient distance to fit into respective locking apertures straddling at least one locking aperture, said load bearing studs resting in engagement in the lower tapered portion of the respective apertures, and the lock stud positioned in the larger portion of an aperture straddled by the load bearing studs.

14. A rack lock in a pallet rack system releasably locking one end of a shelf beam of a pallet rack to an upright column of the pallet rack as defined in claim 10, wherein the dog is formed integral with the lock plate and is engageable with the resilient carrier between the end fixed to the lock plate and the opposite end, said load bearing studs being spaced apart a distance to fit into respective locking apertures straddling at least one locking aperture between the respective locking apertures, said lock stud being positioned in a locking aperture between the respective locking apertures receiving the load bearing studs.

15. A rack lock in a pallet rack system releasably locking one end of a shelf beam of a pallet rack to an upright column of the pallet rack as defined in claim 10, wherein said load bearing studs are spaced apart a distance sufficient to fit into respective locking apertures straddling at least one locking aperture between the respective locking apertures, each of the locking apertures has a general keyhole outline with a larger portion defining the upper side and a smaller tapered portion defining the lower side, said load bearing studs resting in engagement in the lower tapered portion of the respective locking apertures, the lock stud positioned in the larger upper portion of its respective locking aperture positioned between the respective locking apertures receiving the load bearing studs, and said dog is formed integral with the lock plate and is engageable with the resilient carrier between the end fixed to the lock plate and the opposite end.

* * * * *

UNITED STATES PATENT AND TRADEMARK OFFICE
CERTIFICATE OF CORRECTION

PATENT NO. : 5,350,074

DATED : September 27, 1994

INVENTOR(S) : Philip A. Rosenband

It is certified that error appears in the above-indentified patent and that said Letters Patent is hereby corrected as shown below:

Column 2, line 57, after "frames" - - insert - - "16" - -.

Signed and Sealed this

Fifteenth Day of November, 1994

Attest:

BRUCE LEHMAN

Attesting Officer

Commissioner of Patents and Trademarks